(12) United States Patent
McDermott

(10) Patent No.: US 6,775,843 B1
(45) Date of Patent: Aug. 10, 2004

(54) METHOD AND APPARATUS FOR DIGITAL TV CHANNEL MAPPING

(75) Inventor: Michael Donald McDermott, Escondido, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/418,541

(22) Filed: Oct. 14, 1999

(51) Int. Cl.[7] .......................... H04N 5/445; H04N 7/16
(52) U.S. Cl. ...................... 725/151; 725/38; 725/56; 725/139; 725/151
(58) Field of Search ........................ 725/38, 92, 93, 725/100, 139, 56, 141, 142, 151; 348/731, 734, 725

(56) References Cited

U.S. PATENT DOCUMENTS

| | | | |
|---|---|---|---|
| 5,303,233 A | * | 4/1994 | Sugawara |
| 5,864,358 A | * | 1/1999 | Suzuki et al. |
| 6,101,181 A | * | 8/2000 | Passint et al. |
| 6,115,080 A | * | 9/2000 | Reitmeier |
| 6,133,910 A | * | 10/2000 | Stinebruner |
| 6,230,252 B1 | * | 5/2001 | Passint et al. |
| 6,249,320 B1 | * | 6/2001 | Schneidewend et al. |
| 2001/0056577 A1 | * | 12/2001 | Gordon et al. |
| 2003/0133050 A1 | * | 7/2003 | Shintani et al. |

OTHER PUBLICATIONS

Advanced Television Systems Committee; (1995); ATSC Digital Television Standard; Doc. A/53.
Advanced Television Systems Committeee; (1997); Program And System Information Protocol For Terrestrial Broadcast And Cable; Doc. A/65.

* cited by examiner

*Primary Examiner*—Vivek Srivastava
*Assistant Examiner*—Krista Bui
(74) *Attorney, Agent, or Firm*—Blakely, Sokoloff, Taylor & Zafman LLP (57) ABSTRACT

A mapping method and apparatus for digital television channel mapping is described. In one embodiment, the method includes detecting a virtual channel selected by a user where the virtual channel is divided into major and minor channels, obtaining a first physical channel in a first mapping table that maps to the major channel, causing the first physical channel to be tuned, and collecting a first VCT from the first physical channel. The method further includes retrieving a first TTSID assigned to the first physical channel and a CTSID of the virtual channel from the first VCT, and decoding audio and video signals from the first physical channel if the first TTSID is equal to the CTSID. The first and second mapping tables are generated beforehand, e.g., during auto programming.

33 Claims, 7 Drawing Sheets

METHOD AND APPARATUS FOR DIGITAL TV CHANNEL MAPPING

BACKGROUND OF THE INVENTION

1. Field of the Invention

The present invention relates generally to the field of television systems and, more particularly, to a method and apparatus for digital television channel mapping.

2. Background Information

In analog television broadcasting, each broadcaster is assigned a physical channel. The physical channel identifies a unique frequency that is used by a broadcaster to embed television signals for transmission. Thus, there is a direct one-to-one relationship between the channel number selected on the television by the user and the actual frequency assigned to that channel.

In digital television, however, there is a many-to-many relationship between the channel selected on the television and the physical channel. Digital television is defined by Digital Television Standard, published in September of 1995 by the Advanced Television Systems Committee (ATSC) Standard (A/53) [hereinafter referred to as "the DTV Standard"], the contents of which are fully incorporated herein by reference. A virtual channel is defined as having a major channel number and a minor channel number in the form X.Y where "X" is the major channel number and "Y" is the minor channel number. By splitting a virtual channel into major and minor components, a broadcaster is allowed to maintain its channel identity, and at the same time provide multiple programs. Thus, a broadcaster can provide its analog programming on channel C (where "C" is a positive whole number), a first digital programming on channel C.1, a second digital programming on channel C.2, and so on. In digital television, broadcasters can map one or more major channels to one or more physical channels.

To facilitate the mapping of virtual channels to physical channels, each physical channel is assigned a unique Transport Stream Identifier ("TSID"). The TSID is defined in Program and System Information Protocol for Terrestrial Broadcast and Cable, published in December of 1997 by the ATSC Standard (A/65) [hereinafter referred to as "the PSIP protocol"], the contents of which are fully incorporated herein by reference. The PSIP protocol defines a Virtual Channel Table (VCT) that is transmitted for each physical channel. The TSID is contained as part of the header of the table. The DTV standard has a mapping mechanism that maps a virtual channel number with the TSID, and maps the TSID to the physical channel number in order to tune to the correct frequency.

However, there are drawbacks associated with the DTV standard in that the TSID information provided by one or more broadcasters may not be correct. First, the DTV standard allows for a situation where the same major channel can be mapped to different physical channels. For example, the DTV standard allows for virtual channel C.1 to be mapped to a first physical channel, and virtual channel C.2 to be mapped to a different physical channel. Second, two or more different major channels may be mapped to the same physical channel (e.g., both major channels C1 and C2 may be mapped to the same physical channel). This may occur when a broadcaster has extra bandwidth and shares the extra bandwidth with the public for public access. Third, in the typical case, one major channel is contained in one physical channel. However, the TSID used to map a given virtual channel number to a physical channel may not be reliable in that broadcasters may assign the same TSID to two different physical channels without consideration of collisions. In such a case, relying solely upon the TSID for tuning to a physical channel can lead to unpredictable results.

Accordingly, there is a need in the technology for a method and apparatus to overcome the aforementioned drawbacks.

SUMMARY OF THE INVENTION

The present invention is directed at a mapping method and apparatus for digital television channel mapping. In one embodiment, the method includes detecting a virtual channel selected by a user where the virtual channel is divided into major and minor channels, obtaining a first physical channel in a first mapping table that maps to the major channel, causing the first physical channel to be tuned, and collecting a first VCT from the first physical channel. The method further includes retrieving a first TTSID assigned to the first physical channel and a CTSID of the virtual channel from the first VCT, and decoding audio and video signals from the first physical channel if the first TTSID is equal to the CTSID.

Other embodiments are described and claimed herein.

DETAILED DESCRIPTION

The present invention is directed at a mapping method and apparatus for digital television channel mapping. In one embodiment, the method includes detecting a virtual channel selected by a user where the virtual channel is divided into major and minor channels, obtaining a first physical channel in a first mapping table that maps to the major channel, causing the first physical channel to be tuned, and collecting a first VCT from the first physical channel. The method further includes retrieving a first TTSID assigned to the first physical channel and a CTSID of the virtual channel from the first VCT, and decoding audio and video signals from the first physical channel if the first TTSID is equal to the CTSID. The first and second mapping tables are generated beforehand, e.g., during auto programming.

Herein, various terms are used to describe certain elements or characteristics of the present invention. For example, a "communication line" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is construed as information transmitted in a parallel or serial manner. A "physical channel" is a generic term that refers to the 6–8 MHz frequency bands where television signals are embedded for transmission. A "virtual channel" is generally defined as a designation that is recognized by a user as the single entity that will provide access to an analog TV program or a set of one or more digital elementary streams. A channel is called "virtual" because its identification (name and number) may be defined independently from its physical location. A virtual channel may include, for example, digital radio, an analog TV channel, a digital TV channel, multi-visual digital channel, and a data broadcast channel.

Figure 1:
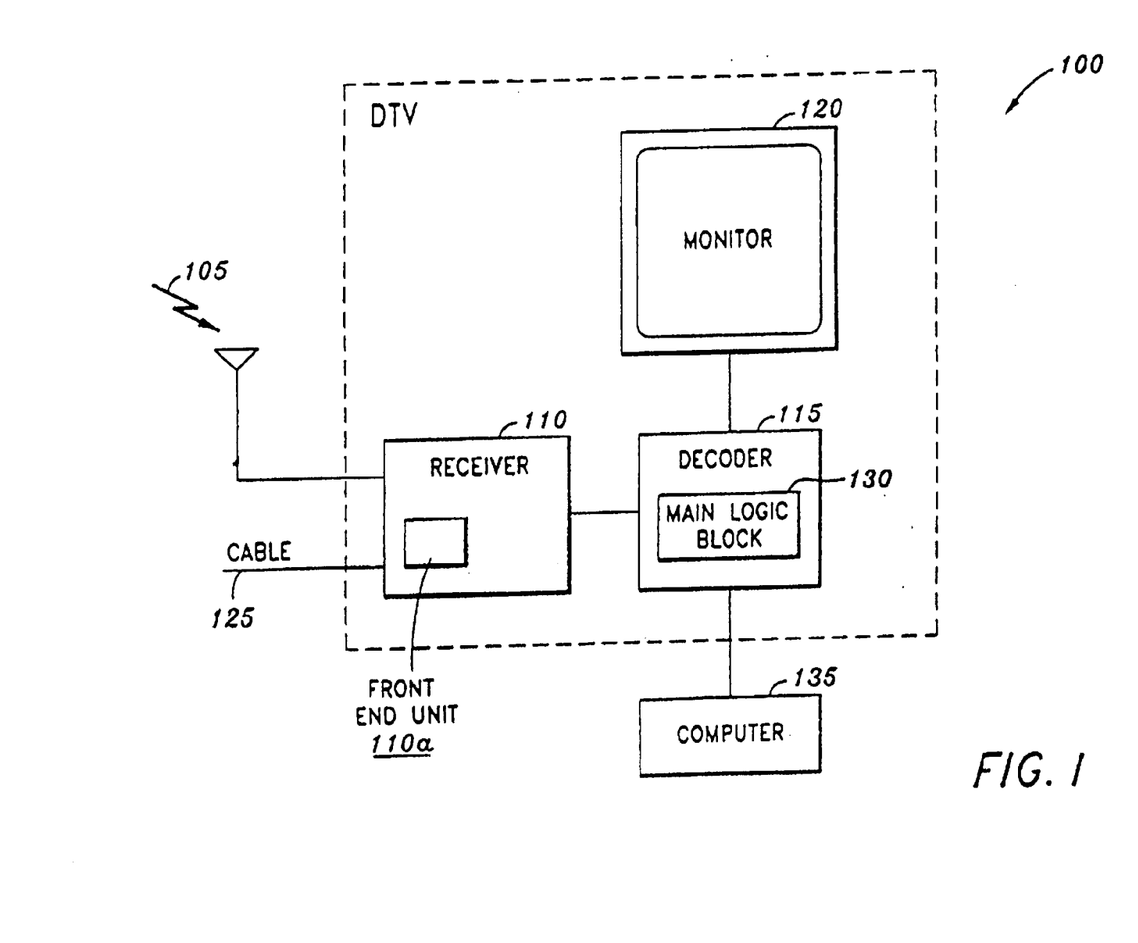
FIG. 1 illustrates one embodiment of a system utilizing the present invention.

Referring to FIG. 1, one embodiment of a system utilizing the present invention is shown. The system 100 comprises an antenna 105, a broadcast receiver 110, a decoder 115 and a monitor 120. In one embodiment, the receiver 110 and the decoder 115 may be a single unit, and may be implemented as an integrated receiver decoder (IRD). The broadcast receiver 110, in general, receives a broadcast and performs operations on the broadcast signal to produce digital information. The digital information is decoded and dispatched to the monitor 120 for display. Alternatively, the broadcast receiver 110 may receive a digital broadcast signal (for example, a digital bit stream) from a digital source via a cable 125. Although the IRD may be implemented as the broadcast receiver in one embodiment, other types of broadcast receivers may be used such as a cable box for a Cable Broadcasting System, an Internet terminal, a digital television (DTV), and the like.

Antenna 105 may receive the digital bit stream from an orbiting satellite (not shown) and routes the bit stream to receiver 110. The bit stream is formatted in accordance with any video compression function and is usually encrypted under either a symmetric key cryptographic function or a public-key cryptographic function. Typically, the bit stream includes sensory data (e.g., video and/or audio, or communication data) and control information for a number of shows. The control information for each show includes programming data having the following content: date of broadcast, broadcast channel number, show start-time, show end-time, and also show title.

The decoder 115 is responsible for decoding the bit stream, for storing programming data, for executing software stored in the processing unit 130 located within the decoder 115, and for processing the decoded bit stream to produce one or more output signals having appropriate formats. As shown, an output signal is placed in an analog format and sent to monitor 120 for viewing. The output signal may also be sent to a recording device (not shown) for recording. The analog format may be in accordance with a video format established by National Television Systems Committee (NTSC), or perhaps other video formats, including but is not limited or restricted to Phase Alternating Line (PAL), Sequential Couleur Avec Memoire (SECAM) and other recognized formats. In one embodiment, the decoder 110 may be coupled to a computer 135 for diagnostic purposes. The computer 135 may be decoupled when the diagnostic procedures are complete.

In one embodiment, the receiver 110 includes a front-end unit 110a. The antenna 105 transfers the bit stream to the front-end unit 110a. Although not shown, the front-end unit 110a includes (i) amplification circuitry used to amplify any relatively weak signals received at antenna 105, and (ii) a tuner which allows a user to receive a desired broadcast channel. The resulting signal is then forwarded to the decoder 115.

Additionally, the receiver 110 is responsible for responding to a plurality of commands from a remote control (not shown). The remote control may include any type of remote control, including one described in U.S. Pat. No. 5,453,758 assigned to Sony Corporation of Tokyo, Japan. Examples of commands from the remote control include commands causing receiver 110 to tune to a particular channel, or for performing a mute operation.

Figure 2:
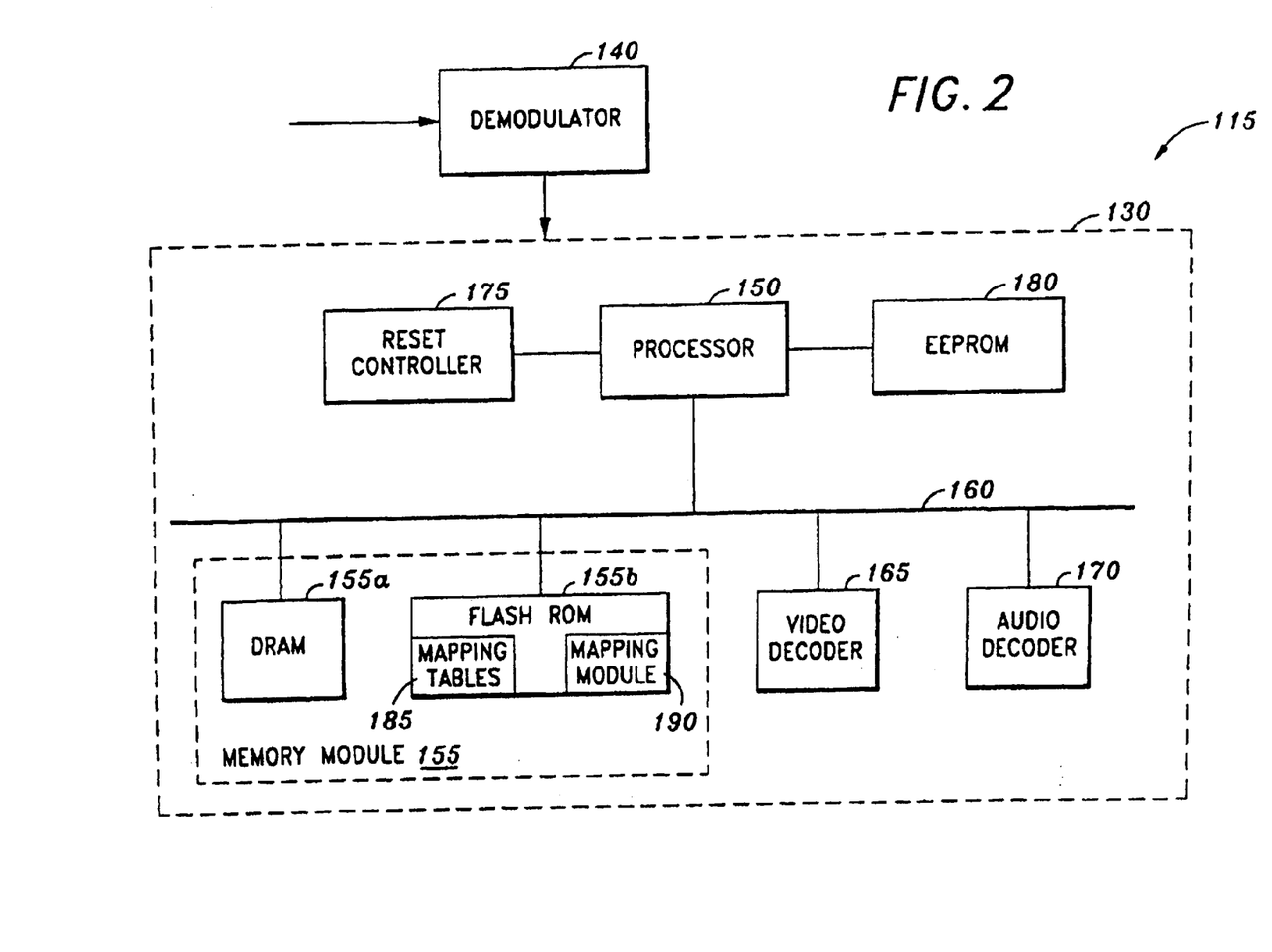
FIG. 2 illustrates one embodiment of the decoder of FIG. 1.

FIG. 2 illustrates one embodiment of the decoder 115 of FIG. 1. For the case where the user wishes to view a show provided by a broadcaster, the bit stream associated with the desired broadcast channel is routed from front-end unit 110a to a demodulator 140 located within decoder 115. In demodulator 140, the bit stream is initially processed before transferring to a main logic block 130 for further processing. Such initial processing may include exposing the bit stream to Vestigial Side Band(VSB) demodulation, viterbi-decoding, de-interleaving and Reed-Solomon decoding.

In certain situations, decoder 115 is connected to other peripheral devices such as digital VCRs, digital video disk players, digital laser disk players and the like. These digital-input peripheral devices communicate with a processor within main logic block 130.

FIG. 2 also illustrates one embodiment of the main logic block 130. As shown, the main logic block 130 comprises a processor 150 that is coupled to a memory module 155 via a system bus 160. The processor 150 includes any one of the x86, Pentium™, Pentium II™, and Pentium Pro™ microprocessors as marketed by Intel™ Corporation, the K-6 microprocessor as marketed by AMD™, or the 6x86MX microprocessor as marketed by Cyrix™ Corp. Further examples include the Alpha™ processor as marketed by Digital Equipment Corporation™, the 680X0 processor as marketed by Motorola™; or the Power PC™ processor as marketed by IBM™. In addition, any of a variety of other processors, including those from Sun Microsystems, MIPS, IBM, Motorola, NEC, Cyrix, AMD, Nexgen and others may be used for implementing processor 150. The processor 150 is not limited to microprocessor but may take on other forms such as microcontrollers, digital signal processors, reduced instruction set computers (RISC), application specific integrated circuits, and the like.

In one embodiment, the memory module 155 includes a DRAM 155a and a FLASH Read Only Memory (ROM) 155b. The FLASH ROM 155b contains mapping tables 185 and a mapping module 190, both of which are optionally copied into DRAM 155a during boot-up. The FLASH ROM 155b further includes other software modules for execution, while the DRAM 155a is also utilized for storing data. Alternatively, the mapping tables 185 are contained in EEPROM 180. The mapping tables 185 are created during auto programming of the digital television system 100, and stored in FLASH ROM 155b. The mapping module 190 detects a virtual channel selected by a user, maps the selected virtual channel to a physical channel, using the mapping tables 185, and causes the receiver 110 (FIG. 1) to tune to the correct frequency.

The main logic block 130 further comprises a video decoder 165 and an audio decoder 170, each of which is coupled to the processor 150 via the system bus 160. The video and audio decoders 165 and 170 perform video and audio processing, respectively. That is, the video decoder 165 decodes the video components of the incoming bit stream while the audio decoder 170 decodes the audio components of the incoming bit stream. The main logic block 130 further comprises a reset controller 175 that is coupled to the processor 150. The reset controller 175 issues reset signals to various subsystems (not shown) within the system 100 (FIG. 1), in response to commands from the processor 150.

Figure 3A:
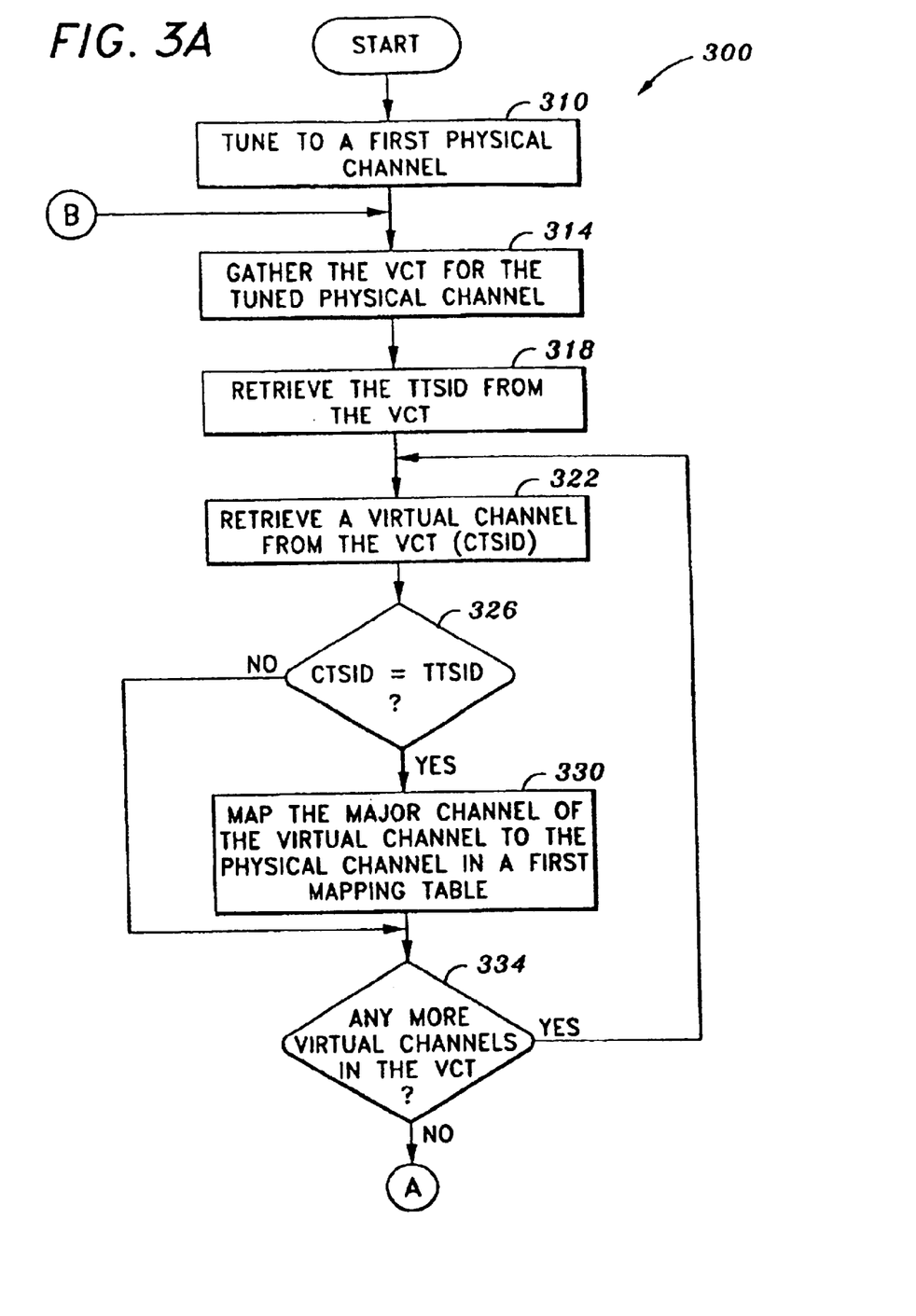
FIGS. 3A and 3B show a flow diagram of an auto programming module for generating mapping tables, according to one embodiment of the present invention.
Figure 3B:
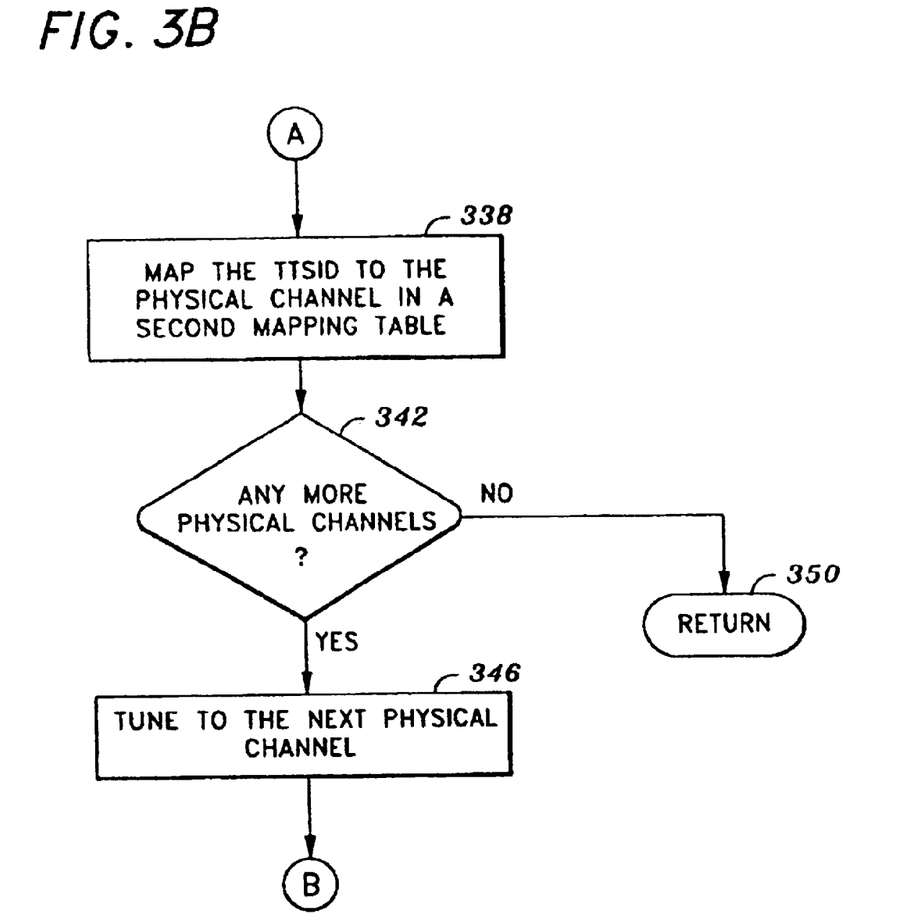

FIGS. 3A and 3B show a flow diagram of an auto programming module 300 for generating mapping tables 185, according to one embodiment of the present invention. In one embodiment, the auto programming module 300 is part of the mapping module 190 of FIG. 2. As its name indicates, the auto programming module 300 is executed during auto programming mode.

Referring to FIGS. 3A and 3B, the auto programming module 300 commences at block 310 where the decoder 115 (FIG. 1) is tuned to a first of many available physical channels. At block 314, a virtual channel table (VCT), as defined in the PSIP protocol, is collected from the transport stream at the frequency that is directly associated with the first physical channel. The VCT contains a list of attributes for virtual channels carried in the transport stream.

Figure 4:
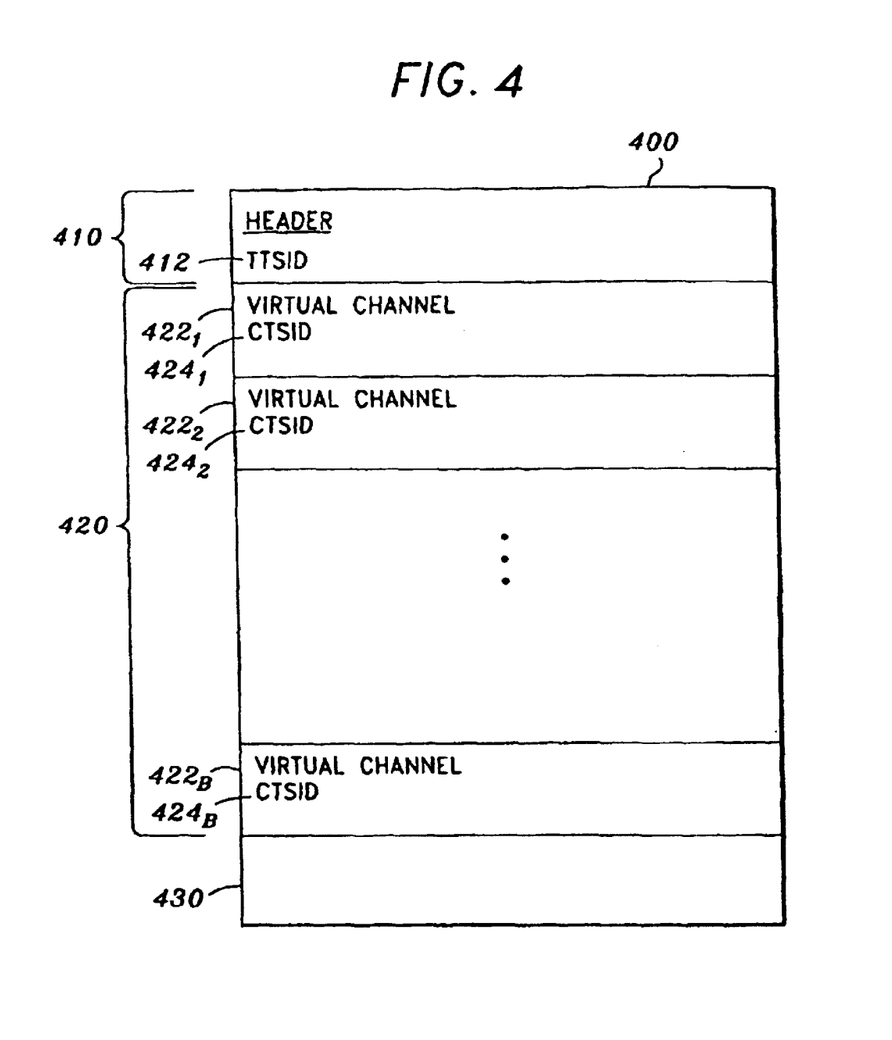
FIG. 4 shows a general format of a VCT.

FIG. 4 shows a general format of a VCT 400. The VCT 400 including its format and content is described in the PSIP protocol. Referring briefly to FIG. 4, the VCT 400 includes a header 410, a body 420, and a tail 430. The header 410 includes, among other things, a Transport TSID (TTSID) 412, which is a unique identifier that is assigned to the current physical channel, and distinguishes the current physical channel (and VCT) from other physical channels (and other VCTs). The body 420 includes one or more virtual channel blocks $422_1$ to $422_B$, where "B" is a positive whole number. Each virtual channel block 422 includes, among other things, a virtual channel number (major and minor) and a Channel TSID (CTSID) 424 that identifies the physical channel (Transport Stream) that is carrying the virtual channel. That is, a VCT 400 not only describes virtual channels in its TTSID, but can also describe virtual channels in other TTSIDs. This allows a broadcaster to describe and display other broadcasters' programming in its own Transport Stream. The tail 430 includes other miscellaneous information such as checksum, etc.

Referring now to FIGS. 3A and 3B, and 4, at block 318 the module 300 retrieves the TTSTD 412 from the VCT 400. At block 322, the module also retrieves a first CTSID from the VCT 400 (e.g., CTSID $424_1$). Then, at block 326, a comparison is made between the TTSID and CTSID collected from the VCT 400. If they are equal, then the virtual channel associated with the CTSID is carried in the current TTSID, and the module moves to block 330. At block 330, the module 300 maps the major channel number of the virtual channel to the current physical channel in a first mapping table (see FIG. 5A). However, if at block 326, the TTSID is not equal to the CTSID, then block 330 is bypassed, as no mapping occurs. At block 334, a determination is made as to whether there are any more virtual channels in the VCT 400. If there are, then the module moves to block 322 where a CTSID of a next virtual channel is retrieved from the VCT 400 (e.g., CTSID $424_2$). In one embodiment, once all CTSIDs are compared to the TTSID, the module 300 moves to block 338 where the TTSID is mapped to the physical channel in a second mapping table (see FIG. 5B). At block 342, a determination is made as to whether there are any more physical channels to tune to. If so, the decoder 115 (FIG. 1) tunes to the next physical channel (block 346), and module 300 jumps back up to block 314. However, if all physical channels have been tuned to during auto programming, the module 300 is complete at block 350.

Figure 5A:
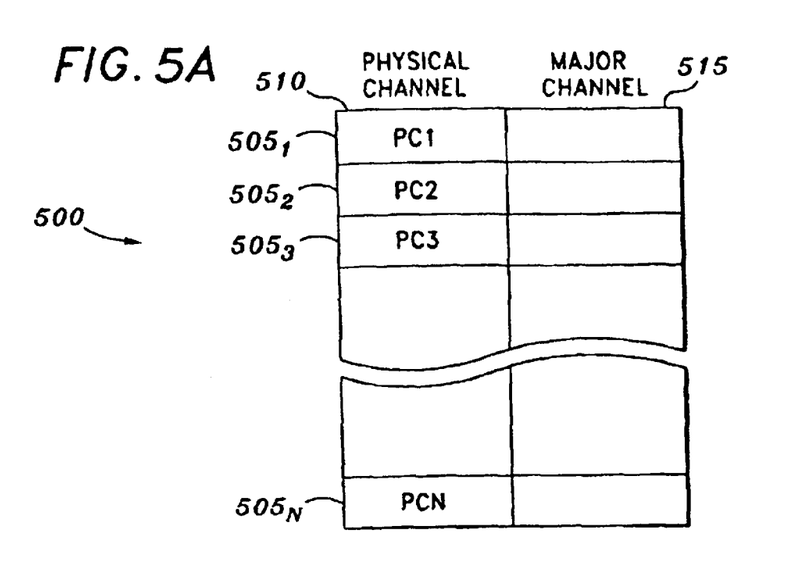
FIGS. 5A and 5B show first and second mapping tables generated during auto programming, according to one embodiment of the present invention.
Figure 5B:
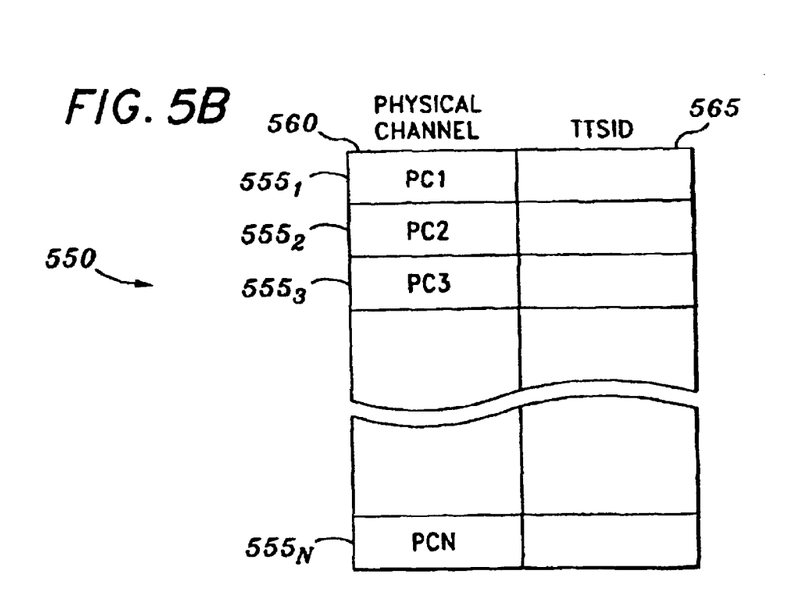

FIGS. 5A and 5B show first and second mapping tables 500 and 550 generated during auto programming, according to one embodiment of the present invention. Referring to FIG. 5A, the first mapping table 500 includes a plurality of entries $505_1$–$505_N$ (where "N" is a positive whole number) in a physical channel column 510. Each entry 505 in the first mapping table 500 corresponds to a physical channel. The physical channels are generally designated as "PC" where PC1 refers to a first physical channel, PC2 refers to a second physical channel, and so on. The first mapping table 500 also includes a major channel column 515 that maps the major channels to the physical channels. Note that more than one major channel number can be mapped to a single physical channel. Referring to FIG. 5B, the second mapping table 550 includes a plurality of entries $555_1$–$555_N$ in a physical channel column 560. Each entry 555 in the second mapping table 550 also corresponds to a physical channel. The second mapping table 550 also includes a TTSID column 565 that maps the TTSIDs to the physical channels. These tables are utilized during normal operation, as described below.

Figure 6:
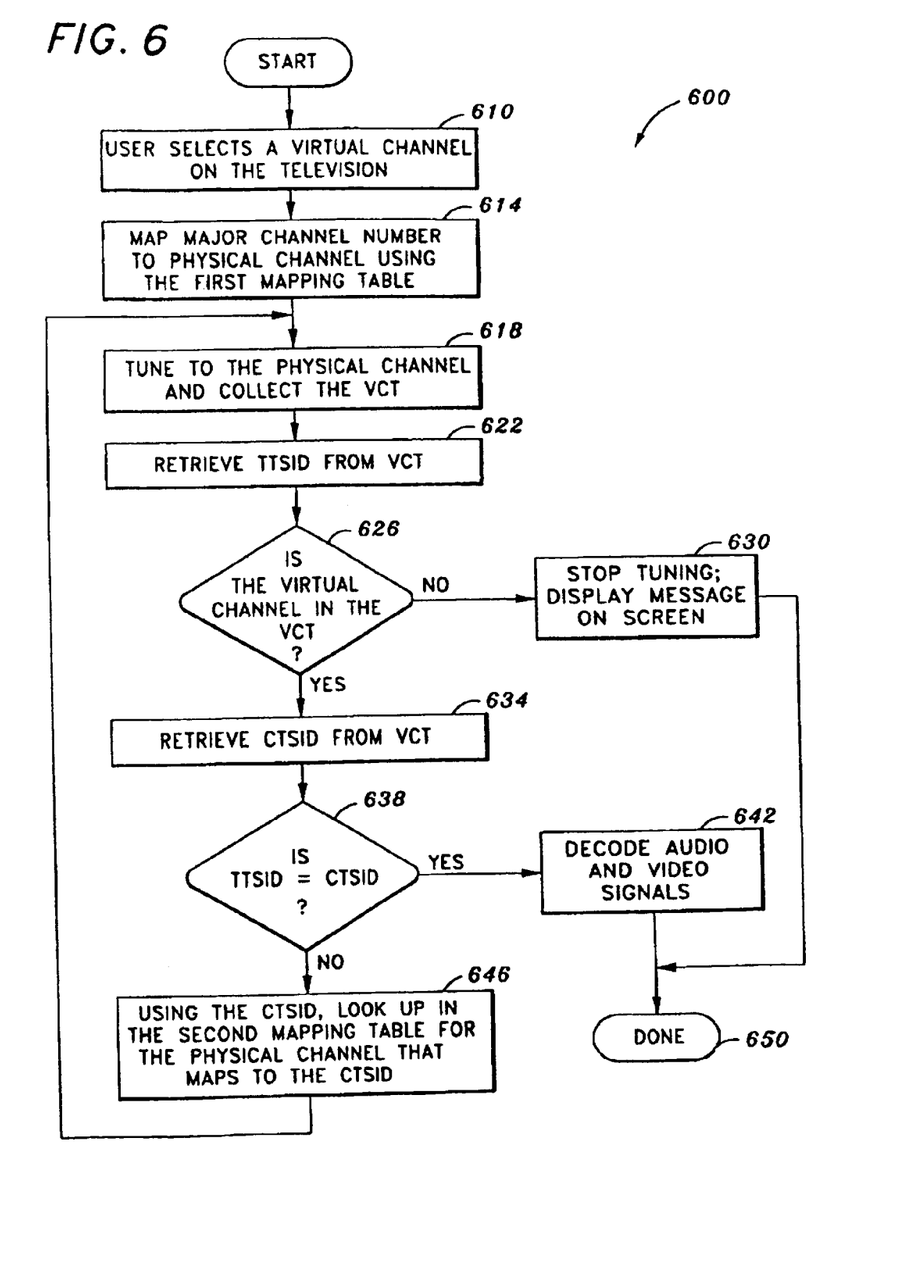
FIG. 6 shows a flow diagram of a mapping module, according to one embodiment of the present invention.

FIG. 6 shows a flow diagram of a mapping module 600, according to one embodiment of the present invention. The mapping module 600 is executed by the processor 150 (FIG. 2) during normal operation, for implementing the present invention.

Referring to FIG. 6, the mapping module 600 commences at block 610 where the user selects a virtual channel on the television (e.g., channel 12.1). The mapping module 600 then has the task of finding the physical channel that carries the selected virtual channel. To that end, the module 600 moves to block 614 where the first mapping table (FIG. 5A) is interrogated, and the physical channel that corresponds to the major channel number of the selected virtual channel (e.g., 12) is determined. At block 618, the module 600 causes the receiver 110 (FIG. 1) to tune to the physical channel, and collects the VCT therefrom. At block 622, the TTSID corresponding to the tuned physical channel is retrieved from the header of the VCT. The module 600, at block 626, determines whether the virtual channel block 422 (see FIG. 4) corresponding to the selected virtual channel is contained in the VCT. If not, the module (block 630) stops tuning and displays a message such as "SERVICE UNAVAILABLE" on the monitor 120. However, if the virtual channel block corresponding to the selected virtual channel is contained in the VCT, then the module 600 retrieves the CTSID from the virtual channel block (block 634).

Continuing to refer to FIG. 6, the module then compares the TTSID with the CTSID (block 638). If they are equal, the virtual channel is indeed carried in the physical channel, as determined from the first mapping table, and thus the receiver has tuned to the correct frequency associated with the physical channel. Consequently, the module 600 decodes the audio and video signals associated with the selected virtual channel (block 642). However, if the TTSID is not equal to the CTSID, the module 600, using the CTSID, looks up in the second mapping table 550 (FIG. 5B) for the physical channel that corresponds to the CTSID (block 646). In another words, the second mapping table is used to determine the physical channel that carries the virtual channel based on the CTSID. The module then jumps back to block 618, causes the receiver 110 to tune to the new physical channel looked up in the second mapping table, and collects the VCT in the new physical channel. At block 622, the TTSID of the new physical channel is obtained. At block 626, a determination is made as to whether the virtual channel block is contained in the new VCT. If not, the module moves to block 630, as before. If so, the module retrieves the CTSID from the virtual channel block (block 634) and compares the TTSID of the new physical channel with the CTSID (block 638). At this point, they should be equal, and the module moves to block 642 as before. In one embodiment, once at block 650, the module 600 moves back to block 610 and waits for the user to select another virtual channel.

Note that at block 638, there may be a scenario where the TTSID will not be equal to the CTSID. One scenario involves a situation where a broadcaster maps the same major channel to different physical channels. The DTV standard does not prohibit the aforementioned scenario. For example, a broadcaster may map a first digital virtual channel 12.1 to physical channel 5, and map a second digital virtual channel 12.2 to physical channel 8. The mapping module 600 utilizes one or both of the mapping tables to tune to the correct physical channel.

Thus, the present invention provides a mapping mechanism for tuning to the correct frequency and physical channel that carries the desired virtual channel, even if a major channel number is located in more than one physical channel. The mapping mechanism of the present invention also selects the correct frequency and physical channel in the cases where two different virtual channels are mapped to a single physical channel. With the mapping mechanism of the present invention, it is more likely to tune to the correct physical channel containing the desired virtual channel in the case where two or more broadcasters are incorrectly using the same TTSID in their physical channels.

In accordance with the practices of persons skilled in the art of computer programming, the present invention is described below with reference to symbolic representations of operations that are performed by computer system 100, unless indicated otherwise. Such operations are sometimes referred to as being computer-executed. It will be appreciated that operations that are symbolically represented include the manipulation by processor 150 of electrical signals representing data bits and the maintenance of data bits at memory locations in memory module 155, as well as other processing of signals. The memory locations where data bits are maintained are physical locations that have particular electrical, magnetic, optical, or organic properties corresponding to the data bits.

Thus, the present invention may be embodied in one of several forms including a method, an apparatus, and a program product that includes a computer readable medium having embodiment therein computer readable program. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" or "machine-readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The data signal may include any signal that can propagate over a transmission medium such as electronic network channels, optical fibers, air, electromagnetic, RF links, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A mapping method for a digital television, comprising:
   detecting a virtual channel selected by a user, the virtual channel divided into major and minor channels;
   obtaining a first physical channel in a first mapping table that maps to the major channel of the virtual channel, the first mapping table being generated during an auto-programming mode to map available physical channels to available major channels;
   causing the first physical channel to be tuned, and collecting a first VCT from the first physical channel;
   retrieving a first TTSID assigned to the first physical channel and a CTSID of the virtual channel from the first VCT; and
   wherein if the first TTSID is equal to the CTSID then the audio and video signals from the first physical channel are decoded and, if the first TTSID is not equal to the CTSID, then a second physical channel from a second mapping table is obtained that maps to the CTSID.

2. The mapping method of claim 1 further comprising:
   if the first TTSID and the CTSID are not equal,
   causing the second physical channel to be tuned, and collecting a second VCT from the second physical channel;
   retrieving a second TTSID assigned to the second physical channel from the second VCT; and
   decoding audio and video signals from the second physical channel if the second TTSID is equal to the CTSID.

3. The mapping method of claim 2 wherein prior to obtaining the first physical channel in the first mapping table, the method comprises:
   tuning to a plurality of physical channels; and
   for each physical channel tuned to,
   placing the physical channel in the first mapping table;
   collecting a VCT from the physical channel;
   retrieving a TTSID from the VCT; and
   for each CTSID corresponding to a virtual channel in the VCT, mapping to the physical channel in the first mapping table, a major channel of the virtual channel if the CTSID of the virtual channel is equal to the TTSID.

4. The mapping method of claim 3 wherein tuning to the plurality of first physical channels comprises tuning to the plurality of physical channels during auto programming.

5. The mapping method of claim 4 wherein for each physical channel tuned to during auto programming, the method comprises:
   placing the physical channel in the first and second mapping tables;
   collecting a VCT from the physical channel;
   retrieving a TTSID from the VCT;
   mapping to the physical channel in the second mapping table, the TTSID retrieved from the VCT; and
   for each CTSID corresponding to a virtual channel in the VCT, mapping to the physical channel in the first mapping table, a major channel of the virtual channel if the CTSID of the virtual channel is equal to the TTSID.

6. The mapping method of claim 1 wherein retrieving the first TTSID assigned to the first physical channel and the CTSID of the virtual channel from the first VCT, comprises:
   retrieving the first TTSID from the first VCT;
   determining whether the virtual channel is contained in the first VCT; and retrieving the CTSID from the first VCT if the virtual channel is contained in the VCT.

7. The mapping method of claim 6 further comprising:

causing tuning of the first physical channel to be stopped if the virtual channel is not contained in the first VCT, and causing a message to be displayed on a monitor.

8. A computer program product, comprising:

a computer usable medium having computer program code embodied therein to detect a virtual channel selected by a user, the virtual channel divided into major and minor channels;

computer readable program code to obtain a first physical channel in a first mapping table that maps to the major channel of the virtual channel, the first mapping table being generated during an auto-programming mode to map available physical channels to available major channels;

computer readable program code to cause the first physical channel to be tuned, and collect a first VCT from the first physical channel;

computer readable program code to retrieve a first TTSID assigned to the first physical channel and a CTSID of the virtual channel from the first VCT; and computer readable program code to decode audio and video signals from the first physical channel if the first TTSID is equal to the CTSID and, if the first TTSID is not equal to the CTSID, to obtain a second physical channel from a second mapping table that maps the CTSID.

9. The computer program product of claim 8 further comprising: if the first TTSID and the CTSID are not equal;

computer readable program code to cause the second physical channel to be tuned, and collect a second VCT from the second physical channel;

computer readable program code to retrieve a second TTSID assigned to the second physical channel from the second VCT; and computer readable program code to decode audio and video signals from the second physical channel if the second TTSID is equal to the CTSID.

10. The computer program product of claim 9 wherein prior to the computer readable program code to obtain a first physical channel in the first mapping table that maps to the major channel of the virtual channel, the computer program product comprises:

computer readable program code to tune to a plurality of physical channels; and for each physical channel tuned to,
  computer readable program code to place the physical channel in the first mapping table;
  computer readable program code to collect a VCT from the physical channel;
  computer readable program code to retrieve a TTSID from the VCT; and
  for each CTSID corresponding to a virtual channel in the VCT, computer readable program code to map to the physical channel in the first mapping table, a major channel of the virtual channel if the CTSID of the virtual channel is equal to the TTSID.

11. The computer program product of claim 10 wherein the computer readable program code to tune to the plurality of physical channels comprises computer readable program code to tune to the plurality of first physical channels during auto programming.

12. The computer program product of claim 11 wherein for each physical channel tuned to during auto programming, the computer program product comprises:

computer readable program code to place the physical channel in the first and second mapping tables;

computer readable program code to collect a VCT from the physical channel;

computer readable program code to retrieve a TTSID from the VCT;

computer readable program code to map to the physical channel in the second mapping table, the TTSID retrieved from the VCT; and for each CTSID corresponding to a virtual channel in the VCT, computer readable program code to map to the physical channel in the first mapping table, a major channel of the virtual channel if the CTSID of the virtual channel is equal to the TTSID.

13. The computer program product of claim 8 wherein the computer readable program code to retrieve the first TTSID assigned to the first physical channel and the CTSID of the virtual channel from the first VCT comprises:

computer readable program code to retrieve the first TTSID from the first VCT;

computer readable program code to determine whether the virtual channel is contained in the first VCT; and computer readable program code to retrieve the CTSID from the first VCT if the virtual channel is contained in the VCT.

14. The computer program product of claim 13 further comprising:

computer readable program code to cause tuning of the first physical channel to be stopped if the virtual channel is not contained in the first VCT; and computer readable program code to cause a message to be displayed on a monitor.

15. An apparatus, comprising:

a memory element having one or more instructions; and a processor coupled to the memory element, the processor, in response to the one or more instructions, to,
  detect a virtual channel selected by a user, the virtual channel divided into major and minor channels,
  obtain a first physical channel in a first mapping table that maps to the major channel of the virtual channel, the first mapping table being generated during an auto-programming mode to map available physical channels to available major channels;
  cause the first physical channel to be tuned, and collect a first VCT from the first physical channel,
  retrieve a first TTSID assigned to the first physical channel and a CTSID of the virtual channel from the first VCT, and
  if the first TTSID is equal to the CTSID then the audio and video signals from the first physical channel are decoded and, if the first TTSID is not equal to the CTSID, then a second physical channel from a second mapping table is obtained that maps the CTSID.

16. The apparatus of claim 15 wherein the processor, in response to the one or more instructions, to further, the first TTSID and the CTSID are not equal, cause the second physical channel to be tuned, and collect a second VCT from the second physical channel;

retrieve a second TTSID assigned to the second physical channel from the second VCT, and decode audio and video signals from the second physical channel if the second TTSID is equal to the CTSID.

17. The apparatus of claim 16 wherein the processor, prior to obtaining the first physical channel in the first mapping table that maps to the major channel of the virtual channel, to, tune to a plurality of physical channels; and for each physical channel tuned to,
place the physical channel in the first mapping table;
collect a VCT from the physical channel;
retrieve a TTSID from the VCT; and
for each CTSID corresponding to a virtual channel in the VCT, map to the physical channel in the first mapping table, a major channel of the virtual channel if the CTSID of the virtual channel is equal to the TTSID.

18. The apparatus of claim 17 wherein the processor tunes to the plurality of physical channels during auto programming.

19. The apparatus of claim 18 wherein the processor, for each physical channel tuned to during auto programming, to, place the physical channel in the first and second mapping tables;

collect a VCT from the physical channel;

retrieve a TTSID from the VCT;

map to the physical channel in the second mapping table, the TTSID retrieved from the VCT; and for each CTSID corresponding to a virtual channel in the VCT, map to the physical channel in the first mapping table, a major channel of the virtual channel if the CTSID of the virtual channel is equal to the TTSID.

20. The apparatus of claim 15 wherein the processor retrieves the first TTSID assigned to the first physical channel and the CTSID of the virtual channel from the first VCT by retrieving the first TTSID from the first VCT;

determining whether the virtual channel is contained in the first VCT; and retrieving the CTSID from the first VCT if the virtual channel is contained in the VCT.

21. The apparatus of claim 20 wherein the processor, in response to the one or more instructions, to further, cause tuning of the first physical channel to be stopped if the virtual channel is not contained in the first VCT; and cause a message to be displayed on a monitor.

22. The mapping method of claim 1 further comprising identifying the first physical channel as analog or digital.

23. The mapping method of claim 22 further comprising detecting the first physical channel as digital.

24. The mapping method of claim 1 further comprising determining a major and minor channel number sequence.

25. The mapping method of claim 24 further comprising receiving a selection from a menu, wherein the selection from the menu corresponds to a channel that has a corresponding minor channel number.

26. The mapping method of claim 25 further comprising generating a major and minor channel number sequence corresponding to a physical channel and the minor channel number corresponding to the selection.

27. The apparatus of claim 15 further comprising means for identifying the first physical channel as analog or digital.

28. The apparatus of claim 27 further comprising means for detecting the first physical channel as digital.

29. The apparatus of claim 15 further comprising means for determining a major and minor channel number sequence.

30. The apparatus of claim 29 further comprising means for receiving a selection from a menu, wherein the selection from the menu corresponds to a channel that has a corresponding minor channel number.

31. The apparatus of claim 30 further comprising means for generating a major and minor channel number sequence corresponding to a physical channel and the minor channel number corresponding to the selection.

32. The apparatus of claim 15 further comprising means for retrieving the first TTSID and the CTSID.

33. The apparatus of claim 15 further comprising means for decoding the audio and video signals from the first physical channel if the first TTSID is equal to the CTSID.

* * * * *